United States Patent
Maguire

(10) Patent No.: US 12,267,808 B2
(45) Date of Patent: Apr. 1, 2025

(54) PAGING AND SIGNALING OPTIMISATION

(71) Applicant: Telefonaktiebolaget LM Ericsson (publ), Stockholm (SE)

(72) Inventor: Patrick Maguire, Athlone (IE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 340 days.

(21) Appl. No.: 17/797,162

(22) PCT Filed: Feb. 7, 2020

(86) PCT No.: PCT/EP2020/053217
§ 371 (c)(1),
(2) Date: Aug. 3, 2022

(87) PCT Pub. No.: WO2021/155957
PCT Pub. Date: Aug. 12, 2021

(65) Prior Publication Data
US 2023/0052947 A1    Feb. 16, 2023

(51) Int. Cl.
*H04W 68/02*    (2009.01)

(52) U.S. Cl.
CPC .................. *H04W 68/02* (2013.01)

(58) Field of Classification Search
CPC .................................................... H04W 68/02
See application file for complete search history.

(56) References Cited

U.S. PATENT DOCUMENTS

| | | | |
|---|---|---|---|
| 2018/0262924 A1* | 9/2018 | Dao | H04W 72/535 |
| 2018/0324577 A1* | 11/2018 | Faccin | H04W 36/0079 |
| 2019/0007992 A1* | 1/2019 | Kim | H04W 76/27 |
| 2019/0059067 A1* | 2/2019 | Lee | H04L 67/141 |
| 2019/0357129 A1* | 11/2019 | Park | H04W 60/04 |
| 2020/0077356 A1* | 3/2020 | Youn | H04W 68/02 |

(Continued)

FOREIGN PATENT DOCUMENTS

| | | |
|---|---|---|
| CN | 110366216 A | 10/2019 |
| CN | 110622589 A | 12/2019 |

(Continued)

OTHER PUBLICATIONS

Unknown, Author, "TS 23.502: handling of PDU sessions at slice unavailability", Qualcomm; SA WG2 Meeting #121 S2-173106 Hangzhou, P.R. China (was S2-17xxxx), May 15-19, 2017, 1-31.

(Continued)

*Primary Examiner* — Kenneth T Lam
(74) *Attorney, Agent, or Firm* — Sonoda & Kobayashi Intellectual Property Law; Sarvajit S. Patil

(57) ABSTRACT

A method performed by a first network function. The method comprises receiving from a second network function a first message indicating that a core network needs to signal with a wireless device in delivering a service to said wireless device. The service is delivered via a network slice. The method also comprises determining an identifier of the network slice associated with the service and determining a connection management state, CM-state, of the wireless device. Further, the method comprises sending a second message in response to said first message, wherein said second message is based on said CM-state and said identifier of the network slice associated with the service.

14 Claims, 3 Drawing Sheets

(56) References Cited

U.S. PATENT DOCUMENTS

| | | | | |
|---|---|---|---|---|
| 2020/0213876 | A1* | 7/2020 | Sun | H04M 15/66 |
| 2020/0245383 | A1* | 7/2020 | Lu | H04W 76/12 |
| 2020/0329455 | A1* | 10/2020 | Ryu | H04W 76/28 |
| 2021/0360582 | A1* | 11/2021 | Priyanto | H04W 4/08 |
| 2022/0248370 | A1* | 8/2022 | Ryu | H04W 68/02 |
| 2023/0045765 | A1* | 2/2023 | Youn | H04W 60/005 |
| 2023/0093965 | A1* | 3/2023 | Velev | H04W 68/12 455/458 |

FOREIGN PATENT DOCUMENTS

| | | |
|---|---|---|
| CN | 110679185 A | 1/2020 |
| CN | 110710157 A | 1/2020 |
| EP | 3541128 A1 | 9/2019 |
| WO | 2018128076 A1 | 7/2018 |

OTHER PUBLICATIONS

3GPP, "3rd Generation Partnership Project; Technical Specification Group Core Network and Terminals; 5G System; Common Data Types for Service Based Interfaces; Stage 3 (Release 15)", 3GPP TS 29.571 V15.3.0, Mar. 2019, 1-73.

3GPP, "3rd Generation Partnership Project; Technical Specification Group Core Network and Terminals; 5G System; Unified Data Management Services; Stage 3 (Release 15)", 3GPP TS 29.503 V15.5.0, Sep. 2019, 1-194.

3GPP, "3rd Generation Partnership Project; Technical Specification Group Radio Access Network; NG-RAN; NG Application Protocol (NGAP) (Release 15)", 3GPP TS 38.413 V15.4.0, Jul. 2019, 1-204.

3GPP, "3rd Generation Partnership Project; Technical Specification Group Radio Access Network; NR; NR and NG-RAN Overall Description; Stage 2 (Release 15)", 3GPP TS 38.300 V15.6.0, Jun. 2019, 1-99.

3GPP, "3rd Generation Partnership Project; Technical Specification Group Services and System Aspects; Management and orchestration; Concepts, use cases and requirements (Release 15)", 3GPP TS 28.530 V15.2.0, Sep. 2019, 1-29.

3GPP, "3rd Generation Partnership Project; Technical Specification Group Services and System Aspects; Procedures for the 5G System (5GS); Stage 2 (Release 16)", 3GPP TS 23.502 V16.3.0, Dec. 2019, 1-558.

3GPP, "3rd Generation Partnership Project; Technical Specification Group Services and System Aspects; Procedures for the 5G System; Stage 2 (Release 16)", 3GPP TS 23.502 V16.0.2, Apr. 2019, 1-419.

3GPP, "3rd Generation Partnership Project; Technical Specification Group Services and System Aspects; System architecture for the 5G System (5GS); Stage 2 (Release 16)", 3GPP TS 23.501 V16.3.0, Dec. 2019, 1-417.

El Hattachi, Rachid, et al., "NGMN 5G White Paper", A Deliverable by the NGMN Alliance, Version 1.0, Feb. 17, 2015, 1-125.

Ericsson, "CN2020 Architecture Specification", Ericsson Internal Technical Report, Apr. 20, 2015, 1-44.

Ericsson, "Ericsson Mobility Report", www.ericsson.com/mobility-report, Nov. 2018, 1-32.

Etri, "(TP for NR BL CR for TS38.413): Solution to Problem Statement 2 in previous summary on S-NSSAI in paging", 3GPP TSG-RAN WG3#102, R3-186620, Spokane, USA, Nov. 12-16, 2018, 1-13.

Nokia, "Provision on NSSAI by CN for overload control", 3GPP TSG-RAN WG2 Meeting NR Adhoc 1807, R2-1810146, Montreal, Canada, Jul. 2-6, 2018, 1-3.

* cited by examiner

PAGING AND SIGNALING OPTIMISATION

TECHNICAL FIELD

The present invention relates to network slicing in a wireless communications network, in general, and in particular to a method and a network element for managing paging in delivering a service to a wireless device in a wireless communications network.

BACKGROUND

An architecture for a 5G wireless communications network is defined in the document 3GPP TS 23.501 V16.3.0.

This document defines a wireless communications network as well as the concept of network slicing. Network slicing is used in a 5G wireless communications network as a mechanism for providing services to users. A network slice comprises a portion of the available network resources. A Single Network Slice Selection Assistance Information (S-NSSAI) identifies a network slice. S-NSSAI includes a Slice/Service type (SST), which refers to the expected Network Slice behaviour in terms of features and services; and may also include a Slice Differentiator (SD). A Slice Differentiator is optional information complementing the Slice/Service type(s) to differentiate amongst multiple Network Slices of the same Slice/Service type.

In a wireless communications network, the finest granularity of service area restriction is a Tracking Area (TA). TA contains at least one cell, but in practice, usually more than one. This implies that the minimal coverage of any slice is one Tracking Area (TA). In management and orchestration systems which deploy network slices, based on received service requests, the orchestration and management system determines what is the coverage requirement associated with the service request. The outcome will be a defined set of one or more tracking areas. The network will then be configured to associate the deployed Network (NW) Slice with the identified tracking areas. The configured TA(s) define the area within which a wireless device, e.g. user equipment (WD) or other devices, associated with the NW Slice are restricted, mobility wise for access to the supported service(s) in the NW Slice.

As mentioned above, a tracking area is a logical entity representing the aggregation of one or many cells. While in certain scenarios (e.g. indoor deployments, or Narrow Band Internet of Things (NB-IoT)) cells could be a dedicated to one NW slice, for the majority of outdoor scenarios, the logical cell and its associated physical radio resources of a radio access network (RAN) are shared, and are not dedicated to one NW slice.

Therefore, the resources of a tracking area (and its associated cells) will be shared by those devices which are permitted access to services in all deployed NW slices requiring this coverage as well as by those devices that are not associated to any particular NW slice.

A wireless device (WD), for example User Equipment (UE) operating in a wireless communications network is connected to RAN by a radio link. The connection, however, is not continuous and, when the WD is in a connection management state CM-IDLE, the WD listens to the RAN intermittently at defined times to receive paging messages. As the WD roams the network its location may be unknown if it remains in the CM-IDLE state. When the wireless communications network wants to set-up a call with such WD in idle mode (i.e. mobile terminating, MT, call) a paging message is used by the network to locate the WD. Because the WD is mobile the network doesn't know its location if the WD is in the idle mode and therefore the paging message(s) is sent usually in more than one cell. After receiving the paging message, the WD connects to the radio access network. Similarly, to the mobile terminating call the RAN may need to page a WD to establish a connection related to a service associated with a network slice. An example of how the paging procedure works is described, for example, in 3GPP TS 23.502 V16.3.0 clause 4.2.3.3.

SUMMARY

According to a first aspect of the present invention there is provided a method performed by a first network function. The method comprises receiving from a second network function a first message indicating that a core network needs to signal with a wireless device in delivering a service to said wireless device. The service is delivered via a network slice. The method also comprises determining an identifier of the network slice associated with the service and determining a connection management state, CM-state, of the wireless device. Further, the method comprises sending a second message in response to said first message, wherein said second message is based on said CM-state and said identifier of the network slice associated with the service.

According to a second aspect of the present invention there is provided a network element for implementing a first network function. The network element comprising a processing circuitry and a memory. The memory contains instructions executable by the processing circuitry such that the network element is operative to receive from a second network function a first message indicating that a core network needs to signal with a wireless device in delivering a service to said wireless device. The service is delivered via a network slice. The network element is operative to determine an identifier of the network slice associated with the service and to determine a connection management state, CM-state, of the wireless device Further, the network element is operative to send a second message in response to said first message, wherein said second message is based on said CM-state and said identifier of the network slice associated with the service.

According to a third aspect of the present invention there is provided a computer program comprising instructions which, when executed on at least one processor, cause the at least one processor to carry out one of the methods described in this document.

According to a fourth aspect of the present invention there is provided a carrier containing a computer program described earlier, wherein the carrier comprises one of an electronic signal, optical signal, radio signal or computer readable storage medium.

According to a fifth aspect of the present invention there is provided a computer program product comprising non transitory computer readable media having stored thereon a computer program described earlier.

According to a sixth aspect of the present invention there is provided a core network comprising a first network element for implementing a first network function and a second network element for implementing a second network function, wherein the first network element is operative to perform one of the methods described in this document.

Further features of the present invention are as claimed in the dependent claims.

The present invention provides the benefit of reduced signaling and/or paging load.

BRIEF DESCRIPTION OF THE DRAWINGS

The present invention will be understood and appreciated more fully from the following detailed description taken in conjunction with the drawings in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 5:
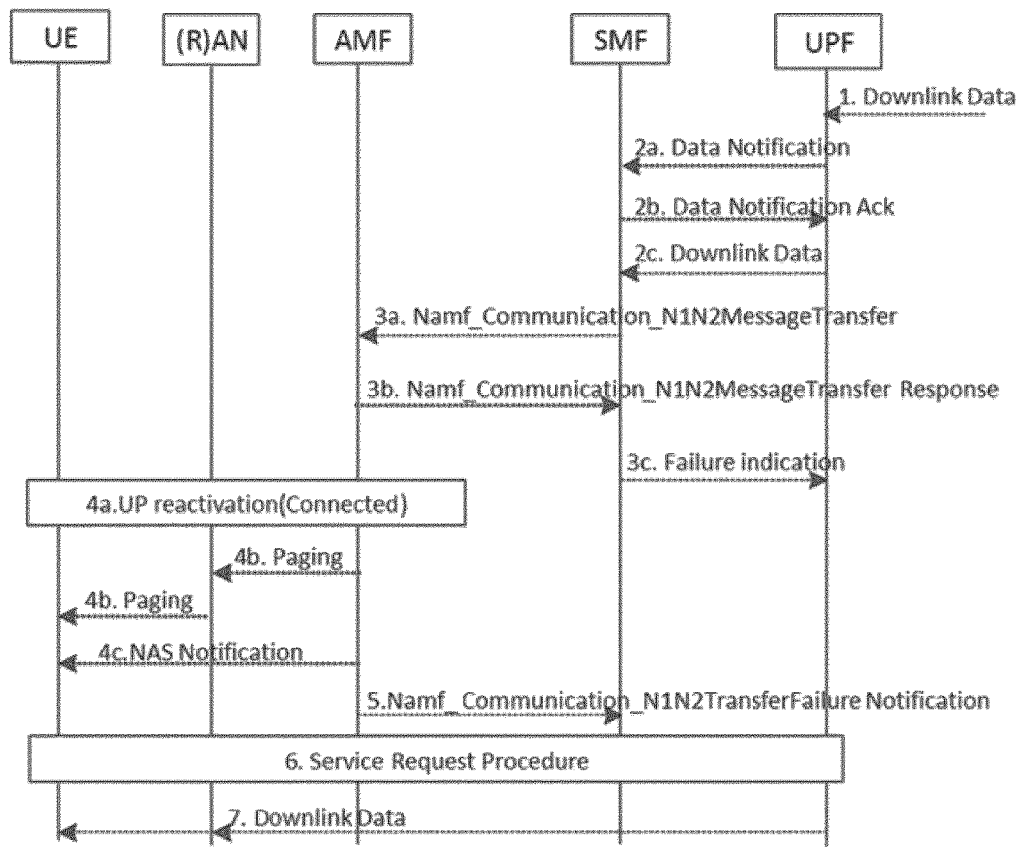
FIG. 5 is a signaling diagram illustrating a network triggered service request disclosed in 3GPP TS 23.502, V16.3.0 clause 4.2.3.3.

As explained in 3GPP TS 23.502, V16.3.0 clause 4.2.3.3 when the core network needs to signal with a wireless device (WD) the procedure is triggered by one of network functions (for example SMF, SMSF, PCF, LMF, GMLC, NEF or UDM). If the wireless device (e.g. UE) is in CM-IDLE state or CM-CONNECTED state in 3GPP access, the network initiates a Network Triggered Service Request procedure. If the UE is in CM-IDLE state, and asynchronous type communication is not activated, the network sends a Paging Request towards the Radio Access Network (also referred to as 5G Access Network) with the intention that the paging will then continue to the wireless device. An example of a message flow for the Network Triggered Service Request is illustrated in FIG. 5 reproduced from clause 4.2.3.3 of the above 3GPP TS 23.502 standard.

Because the procedure is well documented it will not be described now. The inventor realized that the procedure does not take into account network slicing and in consequence signaling associated with Network Triggered Service Request is not optimal and that the number of signaling and paging messages can be reduced if network slicing is considered. The existing solution does not take into consideration that the service associated with "Downlink Data" (flow 7 in FIG. 5) is deployed on a NW slice with a restricted coverage area. Because this restricted coverage areas is not taken into consideration the current solution introduces unnecessary signaling and paging load in the network.

Figure 1:
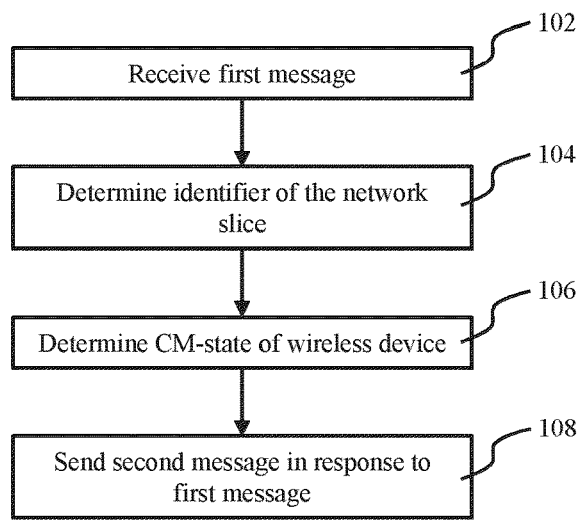
FIG. 1 to FIG. 3 are flow charts illustrating methods in embodiments of the present invention.

FIG. 1 illustrates one embodiment of a method performed in delivering a service to a wireless device in a wireless communications network. In this embodiment the service is delivered via a network slice. The method, performed by an Access and Mobility Management Function, AMF, in a core network, comprises receiving, 102, from a second network function a first message indicating that the core network needs to signal with a wireless device in delivering a service to said wireless device. In a preferred embodiment the first message is the Namf_Communication_N1N2MessageTransfer message 3*a* shown in FIG. 5. The second network function may be one of SMF, SMSF, PCF, LMF, GMLC, NEF or UDM. In the following operation the AMF determines, 104, an identifier of the network slice associated with the service. In a preferred embodiment the identifier is S-NSSAI (Single-Network Slice Selection Assistance Information). In the next operation the AMF determines, 106, a connection management state, CM-state, of the wireless device and then sends, 108, a second message in response to said first message. The second message is based on the determined CM-state and the identifier of the network slice associated with the service.

The CM-state of the wireless device determines where the second message is going to be sent to and the S-NSSAI in preferred embodiments is used to determine the content of the second message.

Figure 2:
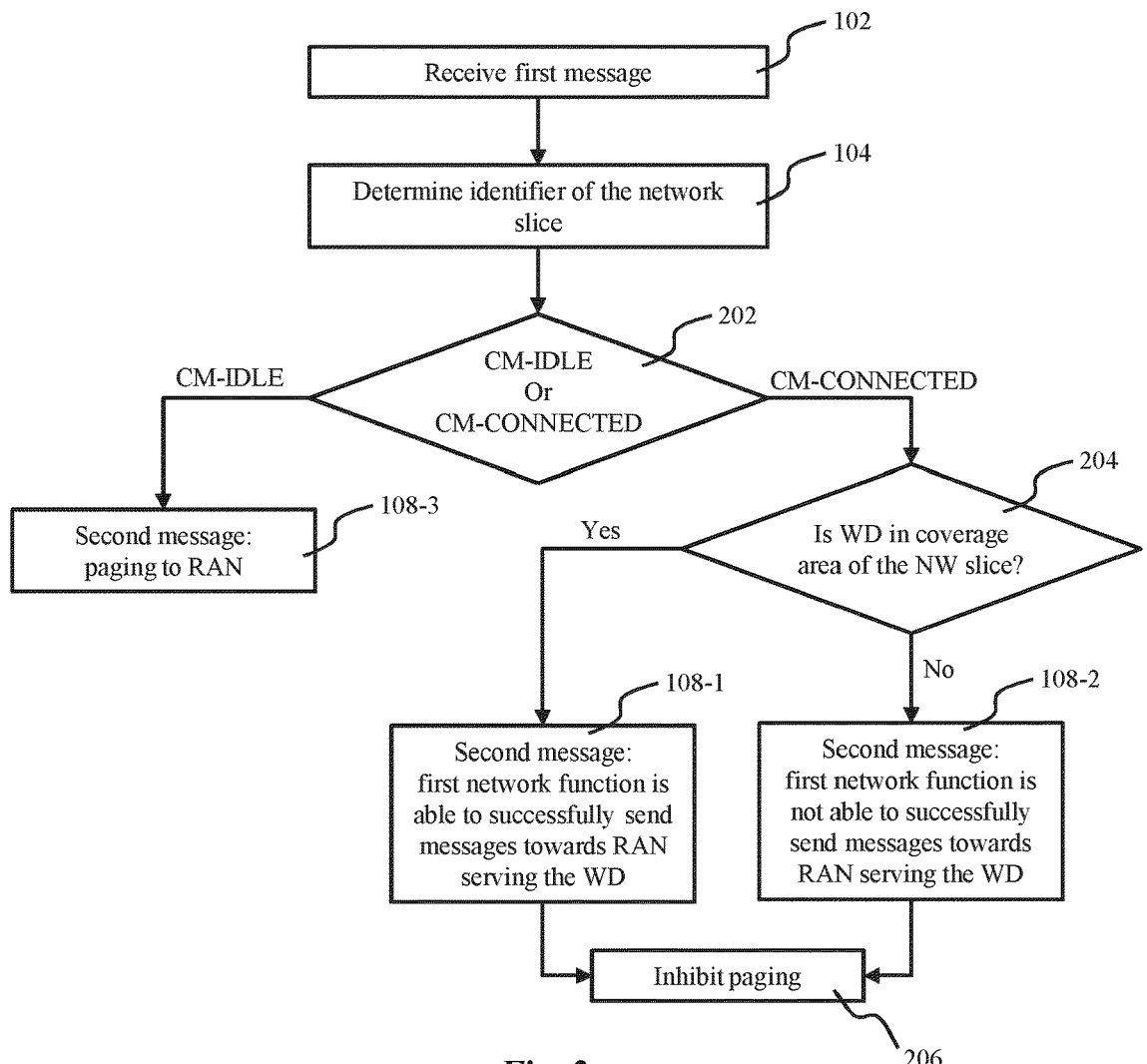
Figure 3:
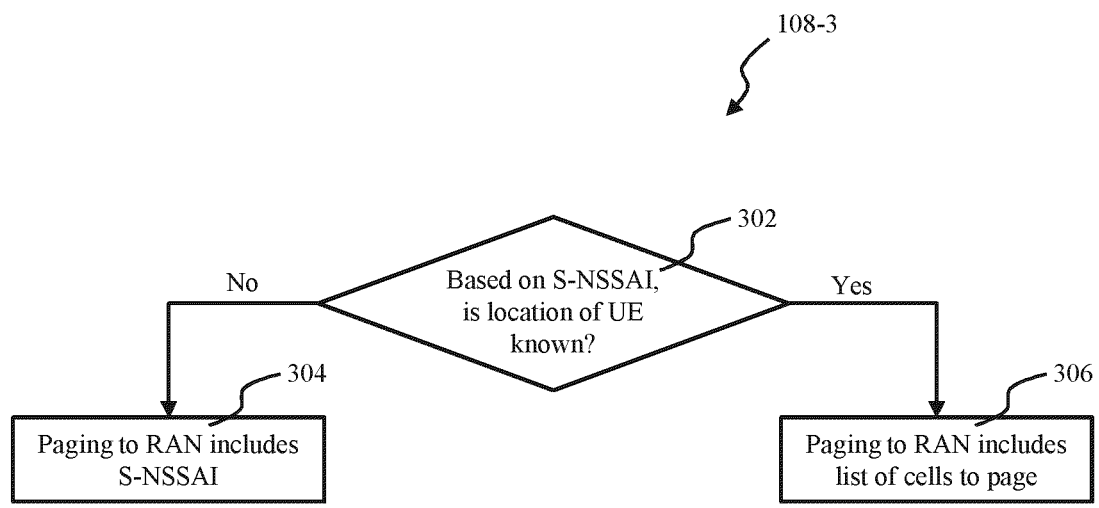

FIGS. 2 and 3 illustrate these embodiments in more detail. If the CM-state of the wireless device is CONNECTED, 202—Connected, then the method comprises determining, 204, if the wireless device is in the coverage area of said network slice associated with the service. When a network slice is instantiated its coverage area is defined and it includes a list of cells of the wireless communications network where the service provided by the network slice is available. Hence, the coverage area of a network slice is restricted, and a wireless device may use the service provided by the network slice if the wireless device is within the coverage area of said network slice. The identifier of the network slice associated with the service, S-NSSAI in a preferred embodiment, may be extracted from the first message (in one embodiment this may be Namf_Communication_N1N2MessageTransfer) and based on this information the AMF may determine the coverage area of the network slice, i.e. the list of cells where the service is available. In alternative embodiments, if the first message (e.g. Namf_Communication_N1N2MessageTransfer) does not contain the identifier of the network slice associated with the service, S-NSSAI, then the S-NSSAI may be determined by the AMF based on the service related identifiers in the Namf_Communication_N1N2MessageTransfer message. The AMF may then perform a lookup, based on the service related identifiers, either internally or with support of Network Slice Selection Function (NSSF) and/or Policy Control Function (PCF) to determine the S-NSSAI to carry the traffic.

Determining the coverage area of the network slice may be done by the AMF in at least two ways. First, the AMF may store this information locally (e.g. in a form of S-NSSAI to Tracking Area list) or the AMF may also perform a lookup in a Network Slice Selection Function (NSSF). When a network slice is deployed in a network, associated with it and configured in RAN are the allowed tracking areas (TAs), wherein each TA represents one or many cells, usually many.

Because the wireless device is in CM-CONNECTED state it is known which cell of the wireless communications network serves this wireless device. This, in turn, may be used to check if the cell serving the wireless device is within the coverage area of the network slice, 204. If the wireless device is in the coverage area of said network slice, 204—Yes, the second message comprises an indication that the AMF is able to successfully send messages towards a radio access network serving the wireless device. The second message is then sent, 108-1, to the second network function and no paging is sent towards the RAN/wireless device, 206. In a preferred embodiment the indication that the AMF is able to successfully send messages towards a radio access network serving the wireless device comprises a cause N1/N2 transfer success known from 3GPP TS 23.502.

If, however, the result of the determination described above indicates that the wireless device is in an area which is not served by the coverage area of said network slice, 204—No, the second message comprises an indication that the first network function is not able to successfully send messages towards a radio access network serving the wireless device. This means that the wireless device cannot use the service provided by the network slice at the current location of the wireless device and, conversely, the service provided by the network slice cannot reach the wireless device. The AMF then sends the second message, 108-2, to the second network function, and no paging is sent towards the RAN/wireless device, 206. In a preferred embodiment the indication that the AMF is not able to successfully send messages towards a radio access network serving the wireless device comprises a cause UE is currently in a Non Allowed Service Area or a similar one. The advantage of this embodiment is that the newly introduced cause UE is currently in a Non-Allowed Service Area notifies the second network function that delivering communication related to the service provided by the network slice to the wireless device is not possible and this may prevent further signaling and/or paging being sent on in the core network, which would have happened if only the CM-CONNECTED state was considered by the AMF in sending the second message to the second network function.

If the determination of the CM-state of the wireless device indicates that the wireless device is in CM-IDLE state, 202—Idle, the second message is sent towards the radio access network serving the wireless device and comprises a paging message, 108-3. including the determined identifier of the network slice (304). As known from 3GPP TS 23.502 the paging sent to the RAN is then forwarded to the wireless device (messages 4b in FIG. 5). However, in embodiments of the present invention the second message (paging sent to the RAN) also comprises the identifier of the network slice, preferably S-NSSAI, 304, which was obtained by the AMF from the first message (Namf_Communication_N1N2MessageTransfer) in the operation 104. By including the S-NSSAI the RAN is instructed (explicitly in the second message, or implicitly by the presence of the S-NSSAI) to page the wireless device only in cells of the network slice identified by the S-NSSAI. The radio access network has access to information identifying the cells providing coverage of the network slice, so by having the S-NSSAI the RAN may select only the cells of the network slice for paging the wireless device. In many situations the S-NSSAI does not allow for determining location of the wireless device, 302—No, so the paging in these situations cannot be more precise than paging in cells of the network slice coverage. The advantage of this embodiment compared with prior art solutions is that instead of paging the UE in the entire wireless communications network only the cells that offer the service provided by the network slice send the paging message to the wireless device. This way the paging load on the network is reduced.

In one embodiment, the paging may be optimised even further. If, based on the S-NSSAI, it is possible to determine location of the wireless device (i.e. the cell on which the wireless device is camped) 302—Yes, then the second message is sent towards a radio access network serving the wireless device and comprises a paging message, 108-3, and includes identification of at least one cell in the radio access network for sending a paging message towards the wireless device, 306. This embodiment covers the situations it which it is known where the wireless devices are located. For example, if the service offered by the network slice is for reading electricity meters installed at customer premises then it is known that the location of the wireless device associated with a particular electricity meter does not change and in consequence the cell which should page the wireless device can also be easily determined from historical data. Hence, the AMF may include identifier of this one cell for paging. Of course, if a plurality of wireless devices serving electricity meters are to be paged then the list of cells to page may include more than one cell (a list of recommended cells for paging). In alternative embodiments the wireless devices may be associated with sensors fixed to buildings, trees, posts or other static objects. The advantage of this embodiment is even greater, instead of blind paging in entire network only carefully selected cell(s) send paging messages dramatically reducing paging load in the network.

Figure 4:
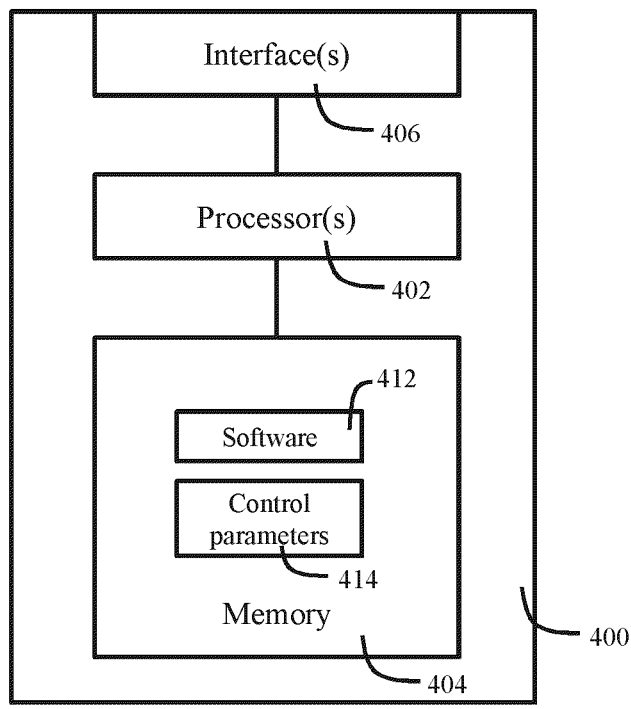
FIG. 4 is a diagram illustrating a network element for implementing a first network function in one embodiment of the present invention.

FIG. 4 illustrates one embodiment of a network element, 400, for implementing a first network function in a core network, which implements the method described earlier. In a preferred embodiment the first network function comprises the Access and Mobility Management Function (AMF). The network element, 400, comprises a processing circuitry, 402, and a memory, 404. The memory, 404, contains instructions executable by the processing circuitry, 402, such that the network element, 400, is operative to receive from a second network function a first message. The first message comprises an indication that the core network needs to signal with a wireless device in order to deliver a service to said wireless device. The service is delivered via a network slice. The network element, 400, is operative to determine an identifier of the network slice associated with the service. As explained earlier, the identifier of the network slice associated with the service (in a preferred embodiment this may be S-NSSAI) may be extracted from the first message (in one embodiment this may be Namf_Communication_N1N2MessageTransfer disclosed in in 3GPP TS 23.502, V16.3.0 clause 4.2.3.3) and based on this information the AMF may determine the coverage area of the network slice, i.e. the list of cells where the service is available. In alternative embodiments, if the first message (e.g. Namf_Communication_N1N2MessageTransfer) does not contain the identifier of the network slice associated with the service, S-NSSAI, then the S-NSSAI may be determined by the AMF based on the service related identifiers in the Namf_Communication_N1N2MessageTransfer message. The AMF may then perform a lookup, based on the service related identifiers, either internally or with support of Network Slice Selection Function (NSSF) and/or Policy Control Function (PCF) to determine the S-NSSAI to carry the traffic. Further, the network element, 400, is operative to determine a connection management state, CM-state, of the wireless device and send a second message in response to said first message. Said second message is based on said CM-state and said identifier of the network slice associated with the service.

The network element, 400, is further operative to perform the operations of the method described in the embodiments disclosed earlier.

The network element, 400, may include a processing circuitry (one or more than one processor), 402, coupled to an interface, 406, and to the memory 404. The network element, 400, may comprise more than one interface. For example, one interface may be for connecting to other network elements, and another interface may be provided for the network operator to perform management operations on the network element, 400. For simplicity and brevity only one interface, 406, has been illustrated in FIG. 4 to represent the possible plurality of interfaces. By way of example, the interface 406, the processor(s) 402, and the memory 404 may be connected in series as illustrated in FIG. 4. Alternatively, these components 402, 404 and 406 may be coupled to an internal bus system of the network element, 400.

The memory 404 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory, 404, may include software, 412, and/or control parameters, 414. The memory, 404, may include suitably configured program code to be executed by the processor(s), 402, so as to implement the above-described method as explained in connection with FIGS. 1-3.

It is to be understood that the structures as illustrated in FIG. 4 are merely schematic and that the network element, 400, may actually include further components which, for the sake of clarity, have not been illustrated, e.g., further interfaces or processors. Also, it is to be understood that the memory, 404, may include further program code for implementing other and/or known functionalities.

According to some embodiments, also a computer program may be provided for implementing functionalities of the network element, 400, e.g., in the form of a physical medium storing the program code and/or other data to be stored in the memory 404, or by making the program code available for download or by streaming.

It is also to be understood that the network element, 400, may be provided as a virtual apparatus. In one embodiment, the network element, 400, may be provided in distributed resources, such as in cloud resources. When provided as virtual apparatus, it will be appreciated that the memory, 404, processing circuitry, 402, and interface(s), 406, may be provided as functional elements. The functional elements may be distributed in a logical network and not necessarily be directly physically connected. It is also to be understood that the network element, 400, may be provided as a single-node device, or as a multi-node system.

Figure 6:
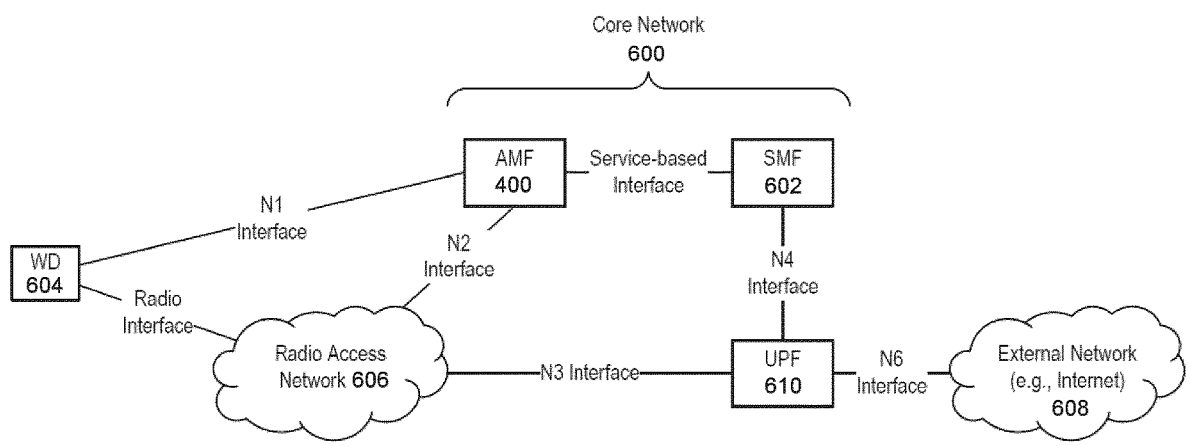
FIG. 6 is a schematic diagram of a wireless communication network showing selected core network nodes and related interfaces operating in one embodiment of the present invention.

FIG. 6 illustrates one embodiment of a core network, 600, comprising a first network element, 400, for implementing a first network function and a second network element, 602, for implementing a second network function. In this embodiment the first network element is operative to perform the method according to any one of the embodiments described earlier with reference to FIGS. 1-3.

In FIG. 6 some of the main core network entities of the 5G Core (5GC) architecture and their related interfaces are illustrated in relation to a wireless device 604, a radio access network 606, and an external network 608. As illustrated, a core network 600 according to the 5GC network architecture comprises an Access and Mobility Management Function (AMF), 400, connected to the wireless device 602 via the N1 interface and to the RAN, 606, via the N2 interface. The AMF, 400, is also connected to a Session Management Function (SMF), 602, via a service-based architecture. The SMF, 602, is also connected to the User Plane Function (UPF), 610, via the N4 interface. The UPF, 610, is connected to the RAN, 606, via the N3 interface and to the external network, 608, via the N6 interface. The UPF, 610, is part of the user plane while the AMF, 400, and SMF, 602, are part of the control plane. The core network in 5G communications network comprises more functions and elements than illustrated in FIG. 6 and described in this document and the drawing as well as its description have been simplified for the sake of brevity More details about the functions and elements of the 5GC can be found in 3GPP TS 23.501 V16.0.3.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form. Some embodiments may be represented as a non-transitory software product stored in a machine-readable medium (also called a computer-readable medium, a processor-readable medium, or a computer usable medium having a computer-readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

Abbreviations

AMF Access and Mobility Management Function
SMF Session Management Function
SMSF Short Message Service Function
PCF Policy Control Function
LMF Location Management Function GMLC Gateway Mobile Location Centre
NEF Network Exposure Function
UDM Unified Data Management
NSSF Network Slice Selection Function
UPF User Plane Function
UE User Equipment

REFERENCES

3GPP TS 23.501 V16.3.0
3GPP TS 23.502 V16.3.0

The invention claimed is:

1. A method performed by a first network function, the method comprising:
  receiving, from a second network function, a first message indicating that a core network needs to signal with a wireless device in delivering a service to said wireless device, wherein the service is delivered via a network slice;
  determining an identifier of the network slice associated with the service;
  determining a connection management state (CM-state) of the wireless device; and
  sending a second message in response to said first message, wherein said second message is based on said CM-state and said identifier of the network slice associated with the service,
  wherein the first network function determines that the CM-state of the wireless device is CONNECTED and the method comprises, in response, determining whether the wireless device is in the coverage area of said network slice associated with the service; and
  wherein the first network function determines that the wireless device is in the coverage area of said network slice and, in response, the second message comprises an indication that the first network function is able to successfully send messages towards a radio access network serving the wireless device and the method comprises sending the second message to the second network function, and inhibiting paging towards said radio access network; or
  wherein the first network function determines that the wireless device is in an area which is not served by the coverage area of said network slice and, in response, the second message comprises an indication that the first network function is not able to successfully send messages towards a radio access network serving the wireless device and the method comprises sending the second message to the second network function, and inhibiting paging towards said radio access network; or
  wherein the first network function determines that the wireless device is in an area which is not served by the coverage area of said network slice and, in response, the second message comprises an indication that the wireless device is in a Non-Allowed Service Area and the method comprises sending the second message to the second network function, and inhibiting paging towards said radio access network.

2. The method of claim 1, wherein the first network function determines that the wireless device is in the coverage area of said network slice and, in response, the second message comprises an indication that the first network function is able to successfully send messages towards a radio access network serving the wireless device and the method comprises sending the second message to the second network function, and inhibiting paging towards said radio access network.

3. The method of claim 1, wherein the first network function determines that the wireless device is in an area which is not served by the coverage area of said network slice and, in response, the second message comprises an indication that the first network function is not able to successfully send messages towards a radio access network serving the wireless device and the method comprises sending the second message to the second network function, and inhibiting paging towards said radio access network.

4. The method of claim 1, wherein the first network function determines that the wireless device is in an area which is not served by the coverage area of said network slice and, in response, the second message comprises an indication that the wireless device is in a Non-Allowed Service Area and the method comprises sending the second message to the second network function, and inhibiting paging towards said radio access network.

5. The method of claim 1 wherein the first network function comprises an Access and Mobility Management Function (AMF).

6. The method of claim 1 wherein the second network function comprises one of a Session Management Function (SMF), a Short Message Service Function (SMSF), a Policy Control Function (PCF), Location Management Function (LMF), Gateway Mobile Location Centre (GMLC), Network Exposure Function (NEF), or Unified Data Management (UDM).

7. A network element for implementing a first network function, the network element comprising a processing circuitry and a memory, the memory containing instructions executable by the processing circuitry such that the network element is configured to:
  receive, from a second network function, a first message indicating that a core network needs to signal with a wireless device in delivering a service to said wireless device, wherein the service is delivered via a network slice;
  determine an identifier of the network slice associated with the service;
  determine a connection management state (CM-state), of the wireless device; and
  send a second message in response to said first message, wherein said second message is based on said CM-state and said identifier of the network slice associated with the service,
  wherein the network element is configured to, in response to determining that the CM-state of the wireless device is CONNECTED, determine whether the wireless device is in the coverage area of said network slice associated with the service; and
  wherein the network element is configured to, in response to determining that the wireless device is in the coverage area of said network slice, include in the second message an indication that the first network function is able to successfully send messages towards a radio access network serving the wireless device, send the second message to the second network function, and inhibit paging towards said radio access network; or
  wherein the network element is configured to, in response to determining that the wireless device is in an area which is not served by the coverage area of said network slice, include in the second message an indication that the first network function is not able to successfully send messages towards a radio access network serving the wireless device, send the second message to the second network function, and inhibit paging towards said radio access network; or wherein the network element is configured to, in response to determining that the wireless device is in an area which is not served by the coverage area of said network slice, include in the second message an indication that the wireless device is in a Non-Allowed Service Area, send the second message to the second network function, and inhibit paging towards said radio access network.

8. The network element of claim 7, wherein the network element is configured to, in response to determining that the wireless device is in the coverage area of said network slice, include in the second message an indication that the first network function is able to successfully send messages towards a radio access network serving the wireless device, send the second message to the second network function, and inhibit paging towards said radio access network.

9. The network element of claim 7, wherein the network element is configured to, in response to determining that the wireless device is in an area which is not served by the coverage area of said network slice, include in the second message an indication that the first network function is not able to successfully send messages towards a radio access network serving the wireless device, send the second message to the second network function, and inhibit paging towards said radio access network.

10. The network element of claim 7, wherein the network element is configured to, in response to determining that the wireless device is in an area which is not served by the coverage area of said network slice, include in the second message an indication that the wireless device is in a Non-Allowed Service Area, send the second message to the second network function, and inhibit paging towards said radio access network.

11. The network element of claim 7, wherein the first network function comprises an Access and Mobility Management Function (AMF).

12. The network element of claim 7, wherein the second network function comprises one of a Session Management Function (SMF), a Short Message Service Function (SMSF), a Policy Control Function (PCF), Location Management Function (LMF), Gateway Mobile Location Centre (GMLC), Network Exposure Function (NEF), or Unified Data Management (UDM).

13. A core network comprising a first network element for implementing a first network function and a second network element for implementing a second network function, wherein the first network element is the network element of claim 7.

14. A non-transitory computer-readable medium comprising, stored thereupon, a computer program comprising instructions configured so that, when executed on at least one processor of a first network function the instructions cause the first network function to:
receive, from a second network function, a first message indicating that a core network needs to signal with a wireless device in delivering a service to said wireless device, wherein the service is delivered via a network slice;
determine an identifier of the network slice associated with the service;
determine a connection management state (CM-state) of the wireless device; and
send a second message in response to said first message, wherein said second message is based on said CM-state and said identifier of the network slice associated with the service,
wherein the network element is configured to, in response to determining that the CM-state of the wireless device is CONNECTED, determine whether the wireless device is in the coverage area of said network slice associated with the service; and
wherein the network element is configured to, in response to determining that the wireless device is in the coverage area of said network slice, include in the second message an indication that the first network function is able to successfully send messages towards a radio access network serving the wireless device, send the second message to the second network function, and inhibit paging towards said radio access network; or
wherein the network element is configured to, in response to determining that the wireless device is in an area which is not served by the coverage area of said network slice, include in the second message an indication that the first network function is not able to successfully send messages towards a radio access network serving the wireless device, send the second message to the second network function, and inhibit paging towards said radio access network; or
wherein the network element is configured to, in response to determining that the wireless device is in an area which is not served by the coverage area of said network slice, include in the second message an indication that the wireless device is in a Non-Allowed Service Area, send the second message to the second network function, and inhibit paging towards said radio access network.

* * * * *